UNITED STATES PATENT OFFICE.

JOHANNES JANSEN AND WILHELM NEELMEIER, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

AZO DYE.

No. 924,232.

Specification of Letters Patent.

Patented June 8, 1909.

Application filed February 23, 1909. Serial No. 479,575.

*To all whom it may concern:*

Be it known that we, JOHANNES JANSEN and WILHELM NEELMEIER, doctors of philosophy, chemists, citizens of the German Empire, residing at Leverkusen, near Cologne, Germany, have invented new and useful Improvements in new Azo Dyes, of which the following is a specification.

Our invention relates to the manufacture and production of new coloring matters capable of dyeing on a mordant.

The new dyestuffs are obtained by combining the diazo compounds of such ortho-aminophenol derivatives which contain neither sulfonic nor carboxylic groups with 1.3–dioxyquinolin.

The new products possess the valuable property that they can be dyed on wool together with bichromate in the same bath. They can also be dyed on a chrome mordant or according to the after-chroming method. The dyeing in one bath is best done by adding the dye with the bichromate to the bath, entering the wool, boiling, adding acetic acid in small portions and boiling again. Fast red shades are thus obtained.

The new dyestuffs are yellowish-red to brown powders soluble in water generally with a red to violet color and soluble in concentrated sulfuric acid generally with a yellowish-red to reddish-brown color. They yield upon reduction with stannous chlorid and hydrochloric acid orthoaminophenol derivatives and 1.3-dioxy-2-aminoquinolin.

In carrying out our new process practically we can proceed as follows, the parts being by weight:—

*Example:*—22.9 parts of picramic acid are diazotized in the usual manner by means of hydrochloric acid and 7 parts of sodium nitrite. The diazo compound is then added to an aqueous solution, which has to be stirred, until the combination is finished, of 20.5 parts of the di-sodium salt of 1.3-di-oxyquinolin in an excess of sodium carbonate. The dyestuff is isolated in the usual way, filtered off, pressed and dried. It is a reddish-brown powder which is soluble in water with a dark-red and which is soluble in concentrated sulfuric acid with a reddish-brown color. By reduction with stannous chlorid and hydrochloric acid 2.4.6-triaminophenol and 1.3-dioxy-2-aminoquinolin are obtained. It dyes wool according to the above described method yellowish-red fast shades.

The process is carried out in an analogous manner on starting from other of the above mentioned ortho-aminophenols, such as 4-chloro-2-aminophenol, 4.6-dichloro-2-aminophenol, 4-nitro-2-aminophenol, 5-nitro-2-aminophenol, 6-chloro-4-nitro-2-aminophenol, 6-nitro-4-chloro-2-aminophenol, 6-methyl-4-nitro-2-aminophenol, 4-methyl-6-nitro-2-aminophenol, 2.4-dinitro-3-methyl-6-aminophenol etc.

We claim:—

1. The herein-described new azo dyestuffs, obtainable from ortho-aminophenol derivatives containing no sulfonic and carboxylic groups and 1.3-dioxyquinolin, which dyestuffs are, after being dried and pulverized, yellowish-red to brown powders soluble in water generally with a red to violet color, soluble in concentrated sulfuric acid generally with a yellowish-red to reddish-brown color; yielding upon reduction with stannous chlorid and hydrochloric acid ortho-aminophenol derivatives and 1.3-dioxy-2-aminoquinolin; and dyeing wool together with bichromate and acid in the same bath fast red shades, substantially as described.

2. The herein-described new azo dyestuff obtainable from picramic acid and 1.3-dioxyquinolin, which dyestuff is, after being dried and pulverized, a reddish-brown powder soluble in water with a dark-red color and soluble in concentrated sulfuric acid with a reddish-brown color; yielding upon reduction with stannous chlorid and hydrochloric acid 2.4.6-triaminophenol and 1.3-dioxy-2-aminoquinolin; and dyeing wool together with bichromate and acid in the same bath yellowish-red fast shades substantially as described.

In testimony whereof we have hereunto set our hands in the presence of two subscribing witnesses.

JOHANNES JANSEN. [L. S.]
WILHELM NEELMEIER. [L. S.]

Witnesses:
OTTO KÖNIG,
OTTO SANDERS.